United States Patent
Anand et al.

(10) Patent No.: US 10,560,399 B2
(45) Date of Patent: *Feb. 11, 2020

(54) METHOD OF DYNAMICALLY RENUMBERING PORTS AND AN APPARATUS THEREOF

(71) Applicant: Cavium Inc., San Jose, CA (US)

(72) Inventors: Vishal Anand, Saratoga, CA (US); Vamsi Panchagnula, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,021

(22) Filed: Jul. 18, 2017

(65) Prior Publication Data

US 2017/0317951 A1    Nov. 2, 2017

Related U.S. Application Data

(63) Continuation of application No. 14/309,789, filed on Jun. 19, 2014, now Pat. No. 9,742,694.

(51) Int. Cl.
*G06F 15/173* (2006.01)
*H04L 12/933* (2013.01)
*H04L 29/06* (2006.01)
*H04L 29/08* (2006.01)
*G06F 8/30* (2018.01)

(52) U.S. Cl.
CPC ............ *H04L 49/109* (2013.01); *H04L 29/06* (2013.01); *H04L 29/08072* (2013.01); *G06F 8/314* (2013.01)

(58) Field of Classification Search
CPC ... H04L 29/08072; H04L 29/06; H04L 45/24; G06F 8/314
USPC .......................... 709/203, 220, 228, 232, 246
See application file for complete search history.

(56) References Cited

U.S. PATENT DOCUMENTS

| | | | |
|---|---|---|---|
| 5,781,729 A | 7/1998 | Baker et al. | |
| 5,805,808 A | 9/1998 | Hasani et al. | |
| 5,951,651 A | 9/1999 | Lakshman | |
| 6,088,356 A | 7/2000 | Hendel et al. | |

(Continued)

FOREIGN PATENT DOCUMENTS

| JP | 2000196672 A | 7/2000 |
|---|---|---|
| JP | 2000253061 A | 9/2000 |

(Continued)

OTHER PUBLICATIONS

The Office Action and English Translation for the Taiwanese application No. 104111755.

(Continued)

*Primary Examiner* — Khanh Q Dinh

(57) ABSTRACT

Embodiments of the apparatus of dynamically renumbering ports relate to a network chip that minimizes the total logic on the network chip by limiting the number of states that needs to be preserved for all ports on the network chip. Each pipe on the network chip implements a dynamic port renumbering scheme that dynamically assigns a relative port number for each port assigned to that pipe. The dynamic port renumbering scheme allows for internal parallelism without increasing the total amount of state space required for the ports on the network chip.

23 Claims, 4 Drawing Sheets

(56) References Cited

U.S. PATENT DOCUMENTS

| | | | |
|---|---|---|---|
| 6,341,129 B1 | 1/2002 | Schroeder et al. | |
| 6,356,951 B1 | 3/2002 | Gentry | |
| 6,606,301 B1 | 8/2003 | Muller et al. | |
| 6,789,116 B1 | 9/2004 | Sarkissian et al. | |
| 6,831,917 B1 | 12/2004 | Cheriton | |
| 6,952,425 B1 | 10/2005 | Nelson | |
| 7,017,162 B2* | 3/2006 | Smith | G06F 9/465 719/315 |
| 7,187,694 B1 | 3/2007 | Liao | |
| 7,293,113 B1 | 11/2007 | Krishna | |
| 7,359,403 B1 | 4/2008 | Rinne | |
| 7,367,052 B1 | 4/2008 | Desanti | |
| 7,391,735 B2 | 6/2008 | Johnson | |
| 7,568,047 B1 | 7/2009 | Aysan et al. | |
| 7,606,263 B1 | 10/2009 | Parker | |
| 7,710,959 B2 | 5/2010 | Ramasamy et al. | |
| 7,715,611 B2 | 5/2010 | Eaton et al. | |
| 7,822,032 B1 | 10/2010 | Parker et al. | |
| 7,903,689 B2 | 3/2011 | Niinomi et al. | |
| 8,031,640 B2 | 10/2011 | Mitsumori | |
| 8,054,744 B1 | 11/2011 | Bishara et al. | |
| 8,112,800 B1 | 2/2012 | Yang et al. | |
| 8,144,706 B1 | 3/2012 | Daniel et al. | |
| 8,570,713 B2* | 10/2013 | Kumfer | H01H 1/0036 361/601 |
| 8,576,713 B2 | 11/2013 | Kamerkar | |
| 8,705,533 B1 | 4/2014 | Venkatraman | |
| 8,804,733 B1 | 8/2014 | Safrai | |
| 9,064,058 B2 | 6/2015 | Daniel | |
| 9,313,115 B2* | 4/2016 | Kamerkar | H04L 43/50 |
| 9,525,647 B2 | 12/2016 | Koponen | |
| 9,590,820 B1 | 3/2017 | Shukla | |
| 9,590,914 B2 | 3/2017 | Alizadeh Attar et al. | |
| 9,742,694 B2* | 8/2017 | Anand | H04L 49/109 |
| 2001/0050914 A1 | 12/2001 | Akahane et al. | |
| 2002/0009076 A1 | 1/2002 | Engbersen | |
| 2002/0016852 A1 | 2/2002 | Nishihara | |
| 2002/0062394 A1 | 5/2002 | Bunn et al. | |
| 2002/0076142 A1* | 6/2002 | Song | G02F 1/3137 385/22 |
| 2002/0083210 A1 | 6/2002 | Harrison et al. | |
| 2002/0163935 A1 | 11/2002 | Paatela | |
| 2002/0191521 A1 | 12/2002 | Minamino et al. | |
| 2003/0037154 A1 | 2/2003 | Poggio et al. | |
| 2003/0144993 A1 | 7/2003 | Kishigami | |
| 2003/0152078 A1 | 8/2003 | Henderson et al. | |
| 2003/0193949 A1 | 10/2003 | Kojima et al. | |
| 2003/0198216 A1* | 10/2003 | Lewis | H04L 12/2856 370/352 |
| 2003/0210702 A1 | 11/2003 | Kendall | |
| 2003/0218978 A1 | 11/2003 | Brown | |
| 2003/0231625 A1 | 12/2003 | Calvignac et al. | |
| 2004/0019733 A1 | 1/2004 | Garinger | |
| 2004/0064589 A1 | 4/2004 | Boucher et al. | |
| 2005/0076228 A1 | 4/2005 | Davis | |
| 2005/0213570 A1 | 9/2005 | Stacy et al. | |
| 2005/0220107 A1* | 10/2005 | DelRegno | H04L 12/4633 370/392 |
| 2005/0232303 A1 | 10/2005 | Deforche et al. | |
| 2005/0246716 A1* | 11/2005 | Smith | G06F 9/465 719/315 |
| 2005/0276230 A1 | 12/2005 | Akahane et al. | |
| 2005/0281281 A1 | 12/2005 | Nair et al. | |
| 2006/0039372 A1 | 2/2006 | Sarkinen et al. | |
| 2006/0168309 A1 | 7/2006 | Sikdar et al. | |
| 2006/0215653 A1 | 9/2006 | LaVigne | |
| 2006/0215695 A1 | 9/2006 | Olderdissen | |
| 2006/0259620 A1 | 11/2006 | Tamai | |
| 2006/0280178 A1 | 12/2006 | Miller et al. | |
| 2007/0078997 A1 | 4/2007 | Stern | |
| 2007/0268931 A1* | 11/2007 | Shaikli | H04J 3/047 370/468 |
| 2008/0008159 A1 | 1/2008 | Bourlas et al. | |
| 2009/0067325 A1 | 3/2009 | Baratakke et al. | |
| 2009/0067446 A1 | 3/2009 | Lee | |
| 2009/0234818 A1 | 9/2009 | Lobo et al. | |
| 2009/0238190 A1 | 9/2009 | Cadigan, Jr. et al. | |
| 2009/0307660 A1* | 12/2009 | Srinivasan | G06F 8/314 717/114 |
| 2010/0161787 A1 | 6/2010 | Jones | |
| 2010/0272125 A1 | 10/2010 | Frank et al. | |
| 2010/0329255 A1 | 12/2010 | Singhal | |
| 2011/0022732 A1 | 1/2011 | Hutchison et al. | |
| 2011/0040923 A1 | 2/2011 | Ren | |
| 2011/0058514 A1 | 3/2011 | Lee et al. | |
| 2011/0134920 A1 | 6/2011 | Dyke | |
| 2011/0142070 A1 | 6/2011 | Lim et al. | |
| 2011/0261698 A1* | 10/2011 | Kamerkar | H04L 43/50 370/235 |
| 2011/0261812 A1 | 10/2011 | Kini et al. | |
| 2011/0268123 A1 | 11/2011 | Kopelman et al. | |
| 2011/0310892 A1 | 12/2011 | DiMambro | |
| 2012/0159132 A1 | 6/2012 | Abel | |
| 2012/0281714 A1 | 11/2012 | Chang et al. | |
| 2013/0039278 A1 | 2/2013 | Bouazizi et al. | |
| 2013/0163427 A1 | 6/2013 | Beliveau et al. | |
| 2013/0163475 A1 | 6/2013 | Beliveau et al. | |
| 2013/0195457 A1 | 8/2013 | Levy et al. | |
| 2013/0215906 A1 | 8/2013 | Hidai | |
| 2013/0238792 A1 | 9/2013 | Kind et al. | |
| 2014/0078902 A1 | 3/2014 | Edsall et al. | |
| 2014/0119231 A1 | 5/2014 | Chan et al. | |
| 2014/0153443 A1 | 6/2014 | Carter | |
| 2014/0269307 A1 | 9/2014 | Banerjee et al. | |
| 2014/0328354 A1 | 11/2014 | Michael | |
| 2014/0369365 A1 | 12/2014 | Denio et al. | |
| 2015/0081726 A1 | 3/2015 | Izenberg | |
| 2015/0189047 A1 | 7/2015 | Naaman et al. | |
| 2015/0222533 A1 | 8/2015 | Birrittella et al. | |
| 2015/0277911 A1 | 10/2015 | Khartikov | |
| 2016/0274944 A1* | 9/2016 | Winkel | G06F 9/30145 |
| 2017/0048144 A1* | 2/2017 | Liu | H04L 47/122 |

FOREIGN PATENT DOCUMENTS

| | | |
|---|---|---|
| JP | 2003308206 A | 10/2003 |
| JP | 2005522948 A | 7/2005 |
| JP | 2007503770 A | 2/2007 |
| JP | 2007166514 A | 6/2007 |
| JP | 2009260880 A | 11/2009 |
| JP | 2009272912 A | 11/2009 |
| JP | 2013055642 A | 3/2013 |
| JP | 2014510504 A | 4/2014 |
| WO | 2005036834 A1 | 4/2005 |
| WO | 2011078108 A1 | 6/2011 |
| WO | 2012138370 A1 | 10/2012 |

OTHER PUBLICATIONS

The Office Action and English Translation for the Taiwanese application No. 104110829.
Office Action for the Japanese Application No. 2015122564 dated Mar. 25, 2019.
Office Action for the Japanese Application No. 2015122559 dated Mar. 18, 2019.
Office Action for the Japanese Application No. 2015122561 dated Mar. 18, 2019.
Office Action for the Japanese Application No. 2015-122562 dated Mar. 18, 2019.
The Japanese Office Action dated Mar. 18, 2019, for Japanese Patent Application No. 2015-122560.

* cited by examiner

METHOD OF DYNAMICALLY RENUMBERING PORTS AND AN APPARATUS THEREOF

RELATED APPLICATION

This Application is a continuation of U.S. application Ser. No. 14/309,789, filed on Jun. 19, 2014, and entitled "A METHOD OF DYNAMICALLY RENUMBERING PORTS AND AN APPARATUS THEREOF," which is hereby incorporated by reference.

FIELD OF INVENTION

The present invention relates to network chips. In particular, the present invention relates to a method of dynamically renumbering ports and an apparatus thereof.

BACKGROUND OF THE INVENTION

As network chips evolve, the need for handling more and more ports has increased. Adding more ports in a network chip often requires internal parallelism, where a portion of the traffic from each port is handled on a separate pipe. By creating more pipes, more ports can be added without causing the internal frequency of the network chip to be increased. However, increasing the number of ports inside the network chip causes problems in logic where states need to be maintained on a per port basis. For example, if the number of ports on the network chip is 128 and the number of pipes on the network chip is 8, then each pipe handles 16 of the 128 ports. Each of these ports is typically given a unique port number, which allows them to be identified. To represent these ports, an eight bit number is used. The eight bit number can represent a total of 256 ports. State space is 256 entries per pipe to store state information of 16 ports. As such, only a small subset of the state space is used. As the number of ports on a network chip increases, so does the state space per pipe. As the state space per pipe increases, so does the total logic on the network chip. It is inefficient to allocate this much state space since much of the state space is sparse.

BRIEF SUMMARY OF THE INVENTION

Embodiments of the apparatus of dynamically renumbering ports relate to a network chip that minimizes the total logic on the network chip by limiting the number of states that needs to be preserved for all ports on the network chip. Each pipe on the network chip implements a dynamic port renumbering scheme that dynamically assigns a relative port number for each port assigned to that pipe. The dynamic port renumbering scheme allows for internal parallelism without increasing the total amount of state space required for the ports on the network chip.

In one aspect, a method of a network chip is provided. The network chip includes N ports and P pipes. The method includes receiving traffic, and utilizing a dynamic port renumbering scheme by each of the P pipes to renumber each of the N ports associated with that pipe such that hardware implemented on the network chip to preserve state information for the N ports is limited.

In some embodiments, each of the P pipes handles traffic from M ports of the N ports. In some embodiments, each of the P pipes uses M relative port numbers in the dynamic port renumbering scheme. In some embodiments, M is the ceiling of N/P.

In some embodiments, utilizing a dynamic port renumber scheme includes, for each of the P pipes, assigning one of M relative port numbers to each of M ports associated with that pipe, storing all of the assignments of relative port numbers to the M ports, and maintaining all states of the M ports using the M relative port numbers.

In some embodiments, assigning one of M relative port numbers includes determining whether renumbering of one of the M ports is completed, based on the determination that the renumbering of that port is completed, using the relative port number previously assigned to that port, and based on the determination that the renumbering of that port is not completed, assigning an unused relative port number of the M relative port numbers to that port.

In some embodiments, the dynamic port renumbering scheme is a self-learning scheme.

In another aspect, a method of a network chip is provided. The network chip includes N ports and P pipes. The method includes, for each of the P pipes, handling traffic from M ports of the N ports, wherein M is the ceiling of N/P, maintaining no more than state space necessary for the M ports, and assigning one of M relative port numbers to each of the M ports. In some embodiments, the one of the M relative port numbers has not yet been used prior to the assignment.

In some embodiments, assigning one of M relative port numbers to each of the M ports includes receiving traffic, identifying one of the M ports that the traffic is from, and determining whether that port had previously been assigned a relative port number.

In some embodiments, the method also includes based on the determination that that port has not yet been assigned a relative port number, assigning an unused relative port number of the M relative port numbers to that port.

In some embodiments, the method also includes storing all of the assignments of the M relative port numbers to the M ports, and maintaining all states of the M ports using the M relative port numbers.

In yet another aspect, a network chip is provided. The network chip includes N ports and P pipes to handle traffic from the N ports. Each of the P pipes handles traffic from M ports of the N ports. Each of the P pipes uses M relative port numbers in the dynamic port renumbering scheme. Typically, M is the ceiling of N/P.

The network chip also includes a dynamic port renumbering scheme utilized by each of the P pipes to renumber each of the N ports associated with that pipe such that hardware implemented on the network chip to preserve state information for the N ports is limited.

In some embodiments, the dynamic port renumbering scheme, for each of the P pipes, assigns one of M relative port numbers to each of M ports associated with that pipe, stores all of the assignments of relative port numbers to the M ports, and maintains all states of the M ports using the M relative port numbers.

In some embodiments, one of M relative port numbers is assigned based on whether renumbering of one of the M ports that incoming traffic is from is completed. In some embodiments, based on the renumbering of that port being completed, the relative port number previously assigned to that port is used. In some embodiments, based on the renumbering of that port being not completed, an unused relative port number of the M relative port numbers is assigned to that port.

In yet another aspect, a network chip is provided. The network chip includes N ports and P pipes. Each of the P pipes handles traffic from M ports of the N ports, wherein M is the ceiling of N/P, maintains no more than state space necessary for the M ports, and assigns one of M relative port numbers to each of the M ports. In some embodiments, the one of the M relative port numbers has not yet been used prior to the assignment.

In some embodiments, each of the P pipes further receives traffic, identifies one of the M ports that the traffic is from, and determines whether that port had previously been assigned a relative port number.

In some embodiments, based on the determination that that port has not yet been assigned a relative port number, the pipe assigns an unused relative port number of the M relative port numbers to that port.

In some embodiments, each of the P pipes further stores all of the assignments of the M relative port numbers to the M ports and maintains all states of the M ports using the M relative port numbers.

In yet another aspect, a network switch is provided. The network switch includes a plurality of switch ports and at least one network chip. The at least one network chip includes N chip ports and P pipes. Typically, the N chip ports are mapped to the plurality of switch ports. Typically, the P pipes utilize a dynamic port renumbering scheme that learns from previous assignments which relative port number to assign to each of P pipes.

In some embodiments, the dynamic port renumbering scheme is implemented by each of the P pipes.

In some embodiments, each of the P pipes handles traffic from M of the N chip ports, wherein M is the ceiling of M/N.

In some embodiments, each of the P pipes determines whether an incoming port has been assigned a relative port number and based on the determination that the incoming port has not been assigned a relative port number, storing the incoming port in a storage array and assigning the incoming port an unused relative port number based on a current pointer to the storage array.

In some embodiments, the determination is based on whether the incoming port is already stored in the storage array.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the apparatus of dynamically renumbering ports relate to a network chip that minimizes the total logic on the network chip by limiting the number of states that needs to be preserved for all ports on the network chip. Each pipe on the network chip implements a dynamic port renumbering scheme that dynamically assigns a relative port number for each port assigned to that pipe. The dynamic port renumbering scheme allows for internal parallelism without increasing the total amount of state space required for the ports on the network chip.

Assume N ports are on a network chip and traffic from the N ports are to be handled by P pipes. It is noted that the terms pipes, buses and channels are used interchangeably herein. There is a maximum of M ports assigned to a single pipe, wherein M is the ceiling of N/P (e.g., division is rounded up). For example, if N=128 and P=8, then each pipe handles traffic from no more than 16 ports. For another example, if N=132 and P=8, then each pipe handles traffic from no more than 17 ports.

In the latter example, to represent the 132 ports, an eight bit number is used. The eight bit number can represent a total of 256 ports. However, as explained above, much of the state space of each pipe is unused since only 17 entries are used to maintain 17 port states. Rather than each pipe having state space for all 256 ports, each pipe only needs enough state space for M ports since no more than M ports are assigned to each pipe. To use just enough state space for the ports assigned to a pipe, the dynamic port renumbering scheme renumbers each port assigned to that pipe. Put differently, the dynamic port renumbering scheme dynamically assigns a relative port number to each port assigned to that pipe. These relative port numbers are thereafter used.

In some embodiments, no software is involved (e.g., no programming required). Instead, the dynamic port renumbering scheme is implemented in hardware. In some embodiments, the dynamic port renumber scheme is a self-learning scheme; the dynamic port renumbering scheme learns from previous assignments which relative port number to assign to a port that has not yet been renumbered.

Table 1 shows an exemplary pseudo-code for the dynamic port renumbering scheme.

TABLE 1

```
//Search for the incoming port
matchFound = 0
for (i=0; i<N/P; i++) {
    if (entries[i].port == incomingPort) {
        matchFound = 1;
        port_index = i;
    }
}
if (matchFound == 0) {
    port_index = current_pointer;
    entries[current_pointer].port = incoming_port;
    current_pointer++;
}
```

Figure 1:
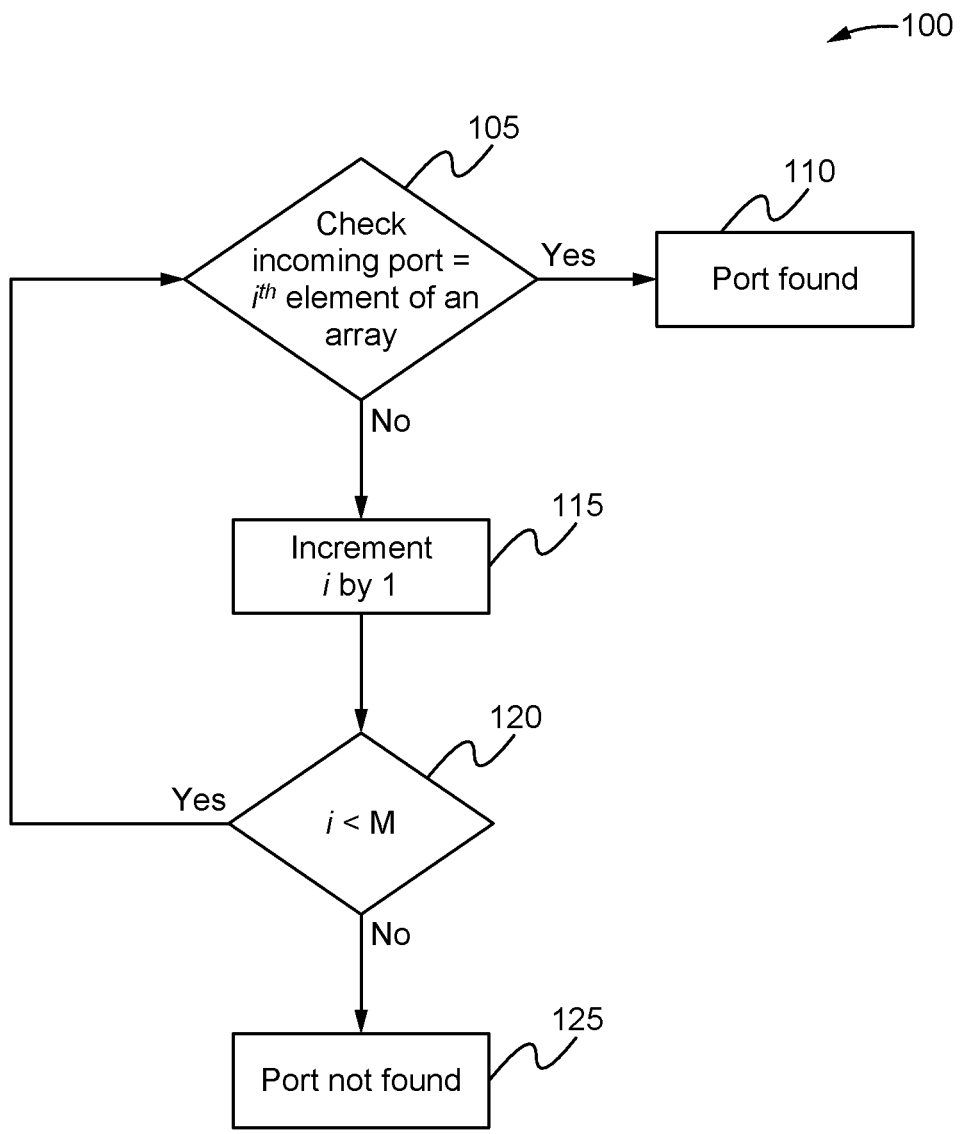
FIG. 1 illustrates a flow diagram of a dynamic port renumbering scheme in accordance with some embodiments of the present invention.

FIG. 1 illustrates a flow diagram 100 of the dynamic port renumbering scheme in accordance with some embodiments of the present invention. In some embodiments, the dynamic port renumbering scheme is implemented by each pipe on the network chip. Assume traffic from an incoming port is received on the pipe. The incoming port is checked with each element of an array to see if the incoming port had already been mapped to a relative port number. If there is a match, then the relative port number is based on the location in the entries array of where the match occurred. If there is no match, then the incoming is port is added to the array and is assigned a relative port number.

Referring to FIG. 1, the incoming port is checked with an $i^{th}$ element of the entries array, where i is typically initialized such as to 0 (step 105). If the $i^{th}$ element of the entries array matches the incoming port, then the port is found (step 110). A port found in the entries array indicates that the port already had been mapped to a relative port number. Typically, once mapped, the port does not need to be remapped. In some embodiments, the relative port number of that port is i.

If the $i^{th}$ element of the entries array does not match the incoming port, then i is incremented by one (step 115). While i is less than M where M is the ceiling of N/P (step 120), then the incoming port is continuously checked with other elements of the entries array until the port is found or until i is no longer less than M. If i is no longer less than M, then the port is not found in the entries array (step 125). A port not found in the entries array indicates that the port has not yet been mapped to a relative port number. The port is added to the entries array such that the next time traffic from the same port is received on the pipe, the port will be found in the entries array. In some embodiments, the relative port number assigned to that port is based on a current pointer to the entries array. After the relative port number is assigned, the current pointer is updated. In some embodiments, the current pointer is incremented by one.

Figure 2A:
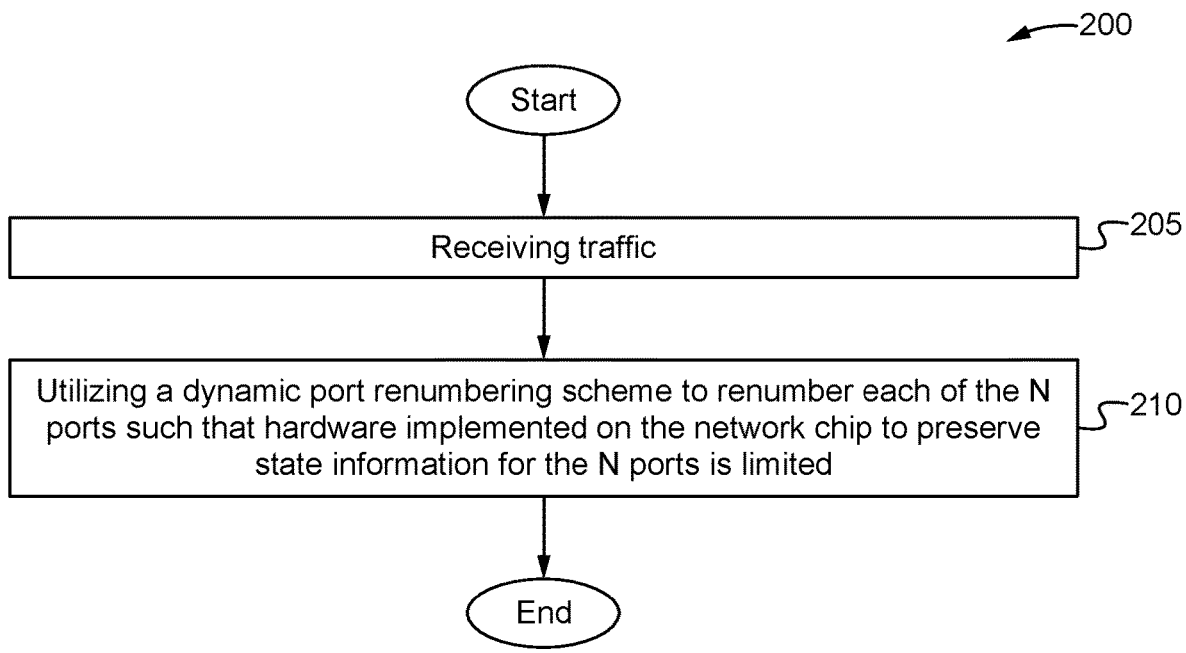
FIGS. 2A-2C illustrate a method of a network chip in accordance with some embodiments of the present invention.

FIG. 2A illustrates a method 200 of the network chip in accordance with some embodiments of the present invention. The network chip includes N ports and P pipes. Each of the P pipes handles traffic from M ports of the N ports, where M is the ceiling of N/P. At a step 205, traffic is received.

At a step 210, a dynamic port renumbering scheme is utilized by each of the P pipes to renumber each of the N ports associated with that pipe such that hardware implemented on the network chip to preserve state information for the N ports is limited. Each of the P pipes uses M relative port numbers in the dynamic port renumbering scheme. In some embodiments, the step 210 includes a method discussed in FIG. 2B.

Figure 2B:
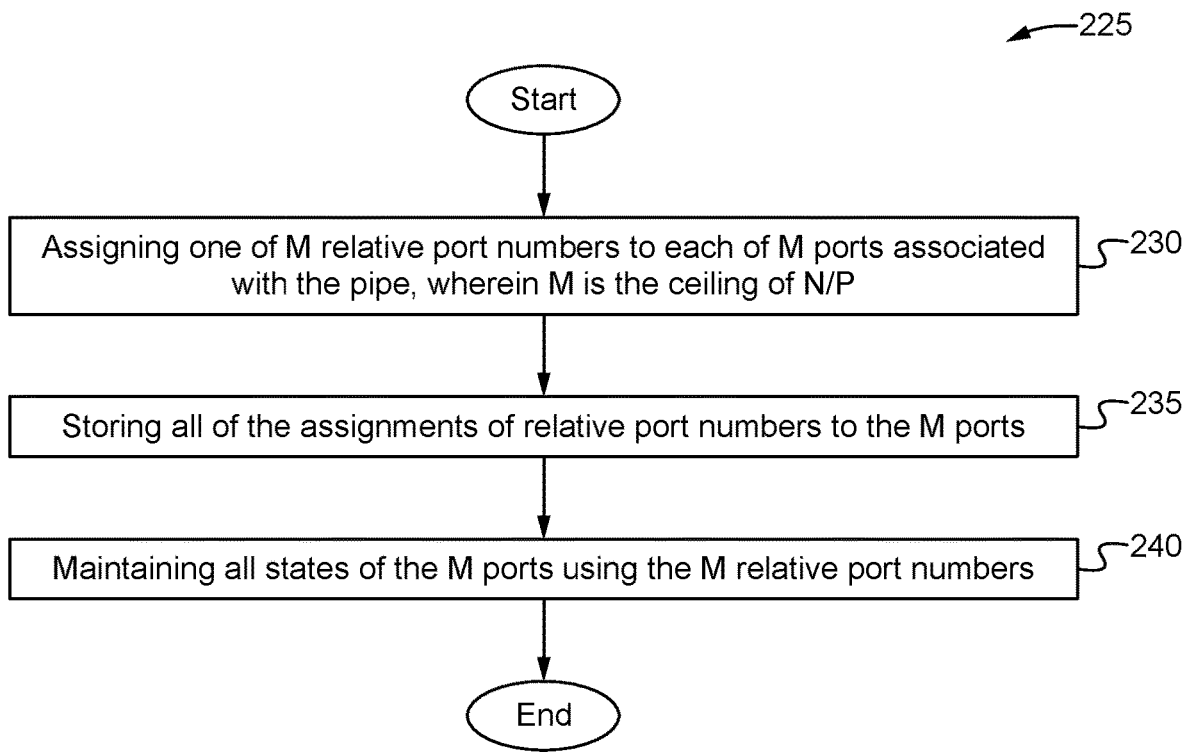

FIG. 2B illustrates the method 225 in accordance with some embodiments of the present invention. In some embodiments, the method 225 is performed for each of the P pipes. At a step 230, one of M relative port numbers is assigned to each of M ports associated with the pipe. In some embodiments, the step 230 includes a method discussed in FIG. 2C.

Figure 2C:
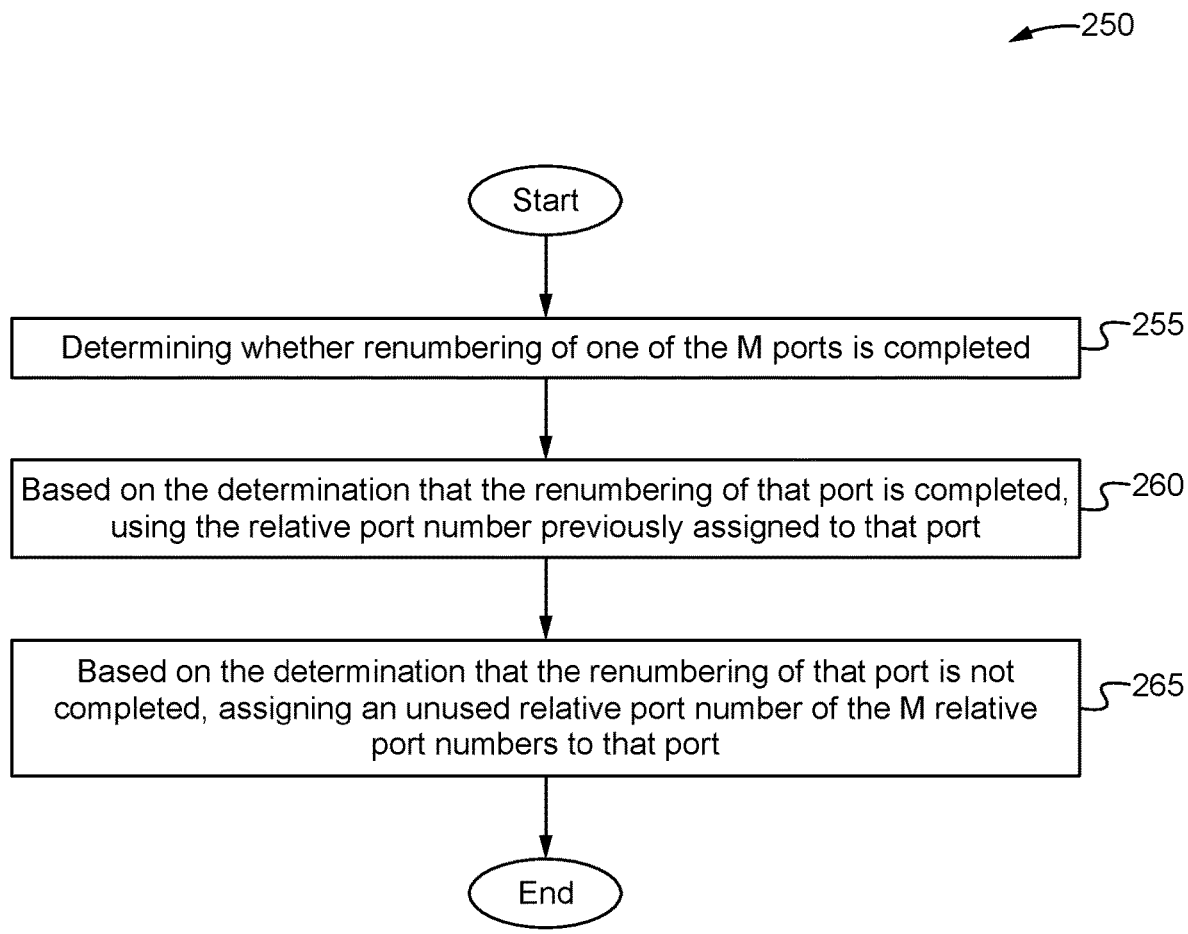

FIG. 2C illustrate the method 250 in accordance with some embodiments of the present invention. At a step 255, it is determined whether renumbering of one of the M ports is completed.

At a step 260, based on the determination that the renumbering of that port is completed, the relative port number previously assigned to that port is used.

At a step 265, based on the determination that the renumbering of that port is not completed, an unused relative port number of the M relative port numbers is assigned to that port. In some embodiments, the order of the steps 260 and 265 is not critical. The steps can be performed currently or one before the other.

Returning to FIG. 2B, at a step 235, all of the assignments of relative port numbers to the M ports are stored.

At a step 240, all states of the M ports using the M relative port numbers are maintained.

Figure 3A:
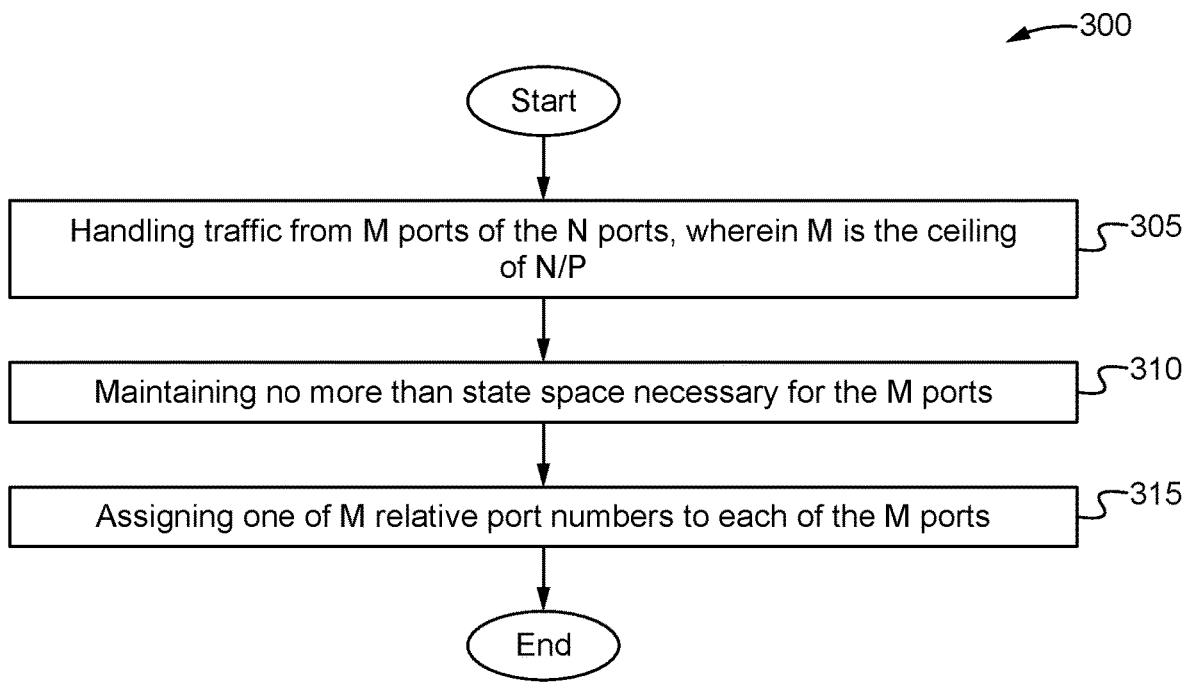
FIGS. 3A-3B illustrate another method of the network chip in accordance with some embodiments of the present invention.

FIG. 3A illustrates another method 300 of the network chip in accordance with some embodiments of the present invention. The network chip includes N ports and P pipes. The method 300 is typically performed by each of the P pipes. At a step 305, traffic from M ports of the N ports are handled by a pipe. Typically, M is the ceiling of N/P.

At a step 310, no more than state space necessary for the M ports are maintained.

At a step 315, one of M relative port numbers is assigned to each of the M ports. The one of the M relative port numbers typically has not yet been used prior to the assignment of the step 315. In some embodiments, the step 315 includes a method discussed in FIG. 3B.

Figure 3B:
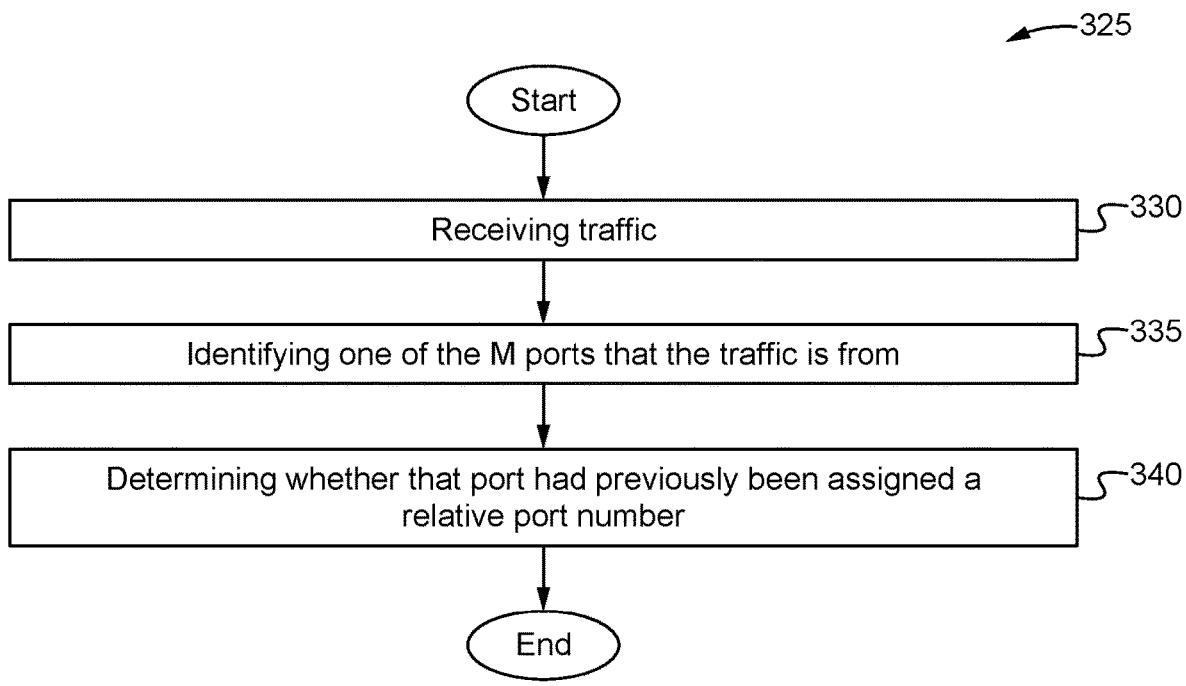

FIG. 3B illustrates the method 325 in accordance with some embodiments of the present invention. At a step 330, traffic is received.

At a step 335, one of the M ports that the traffic is from is identified.

At a step 340, it is determined whether that port had previously been assigned a relative port number. Based on the determination that that port has not yet been assigned a relative port number, an unused relative port number of the M relative port numbers is assigned to that port.

All of the assignments of the M relative port numbers to the M ports are stored. And, all states of the M ports using the M relative port numbers are maintained.

Typically, the network chip is a part of a network device, such as a network switch, that is able to switch/route network traffic. The network switch includes a plurality of switch ports for receiving packets. The ports on the network chip are typically mapped to the plurality of switch ports. The network traffic is typically handled by the pipes on the network chip. In some embodiments, the network switch includes more than one network chip. The dynamic port renumbering scheme limits the number of states that needs to be preserved for all ports on the network chip, thereby advantageously minimizing the total logic on the network chip.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method of a network chip including N ports and P pipes, wherein each of the P pipes is associated with M ports of the N ports, the method comprising:
   receiving traffic comprising one or more packets; and
   for each of the P pipes, renumbering the M ports associated with that pipe by assigning one of M relative port numbers to each of the M ports, wherein the M relative port numbers assigned by each one of the P pipes are able to be independent of the M relative port numbers assigned by each other pipe of the P pipes, and further wherein each of the P pipes receive the traffic from the M ports associated with that pipe.

2. The method of claim 1, wherein the renumbering comprises, for each of the P pipes:
   storing all of the assignments of relative port numbers to the M ports.

3. The method of claim 2, wherein assigning one of M relative port numbers includes:

determining whether renumbering of one of the M ports is completed;

based on the determination that the renumbering of that port is completed, using the relative port number previously assigned to that port; and based on the determination that the renumbering of that port is not completed, assigning an unused relative port number of the M relative port numbers to that port.

4. A method of a network chip including N ports and P pipes, the method comprising:

for each one of the P pipes:

receiving traffic including one or more packets from a subset of M ports of the N ports; and assigning a different one of M relative port numbers to each of the M ports, wherein the M relative port numbers are associated with the one of the P pipes and are able to be independent of the M relative port number assigned by each other pipe of the P pipes.

5. The method of claim 4, wherein the one of the M relative port numbers has not yet been used prior to the assignment.

6. The method of claim 4, wherein assigning one of M relative port numbers to each of the M ports includes:

receiving one or more of the packets of the traffic;

identifying one of the M ports that the one or more of the packets are from; and determining whether that port had previously been assigned a relative port number.

7. The method of claim 6, further comprising, based on the determination that that port has not yet been assigned a relative port number, assigning an unused relative port number of the M relative port numbers to that port.

8. The method of claim 4, further comprising:

storing all of the assignments of the M relative port numbers to the M ports; and maintaining all states of the M ports using the M relative port numbers.

9. A network chip comprising:

N ports;

P pipes, wherein each of the P pipes receives traffic including one or more packets from M ports of the N ports; and a dynamic port renumbering scheme utilized by each of the P pipes to renumber each of the M ports associated with that pipe by assigning one of M relative port numbers to each of the M ports associated with that pipe, wherein the M relative port numbers assigned by each one of the P pipes are able to be independent of the M relative port numbers assigned by each other pipe of the P pipes.

10. The network chip of claim 9, wherein each of the P pipes uses M relative port numbers in the dynamic port renumbering scheme.

11. The network chip of claim 9, wherein the dynamic port renumbering scheme, for each of the P pipes:

stores all of the assignments of relative port numbers to the M ports.

12. The network chip of claim 11, wherein one of M relative port numbers is assigned based on whether renumbering of one of the M ports that one or more incoming packets of the traffic are from is completed.

13. The network chip of claim 12, wherein based on the renumbering of that port being completed, the relative port number previously assigned to that port is used.

14. The network chip of claim 12, wherein based on the renumbering of that port being not completed, an unused relative port number of the M relative port numbers is assigned to that port.

15. A network chip comprising:

N ports; and

P pipes, wherein each of the P pipes:

receives traffic including one or more packets from a subset of M ports of the N ports; and assigns a different one of M relative port numbers to each of the M ports, wherein the M relative port numbers are associated with the one of the P pipes and are able to be independent of the M relative port numbers assigned by each other pipe of the P pipes.

16. The method of claim 15, wherein the one of the M relative port numbers has not yet been used prior to the assignment.

17. The network chip of claim 15, wherein each of the P pipes further:

receives one or more of the packets of the traffic;

identifies one of the M ports that the one or more of the packets are from; and determines whether that port had previously been assigned a relative port number.

18. The method of claim 17, further comprising, based on the determination that that port has not yet been assigned a relative port number, the pipe assigns an unused relative port number of the M relative port numbers to that port.

19. The method of claim 15, wherein each of the P pipes further stores all of the assignments of the M relative port numbers to the M ports and maintains all states of the M ports using the M relative port numbers.

20. A network switch comprising:

a plurality of switch ports; and at least one network chip including N chip ports and P pipes, wherein each of the P pipes is associated with M ports of the N chip ports and the N chip ports are mapped to the plurality of switch ports, and further wherein the P pipes renumber the M ports associated with that pipe by assigning one of M relative port numbers to each of the M ports associated with that pipe, wherein the M relative port numbers assigned by each one of the P pipes are able to be independent of the M relative port numbers assigned by each other pipe of the P pipes, wherein each of the P pipes receives traffic including one or more packets from M ports of the N chip ports.

21. The network switch of claim 20, wherein the dynamic port renumbering scheme is implemented by each of the P pipes.

22. The network switch of claim 20, wherein each of the P pipes:

determines whether an incoming port has been assigned a relative port number; and based on the determination that the incoming port has not been assigned a relative port number, storing the incoming port in a storage array and assigning the incoming port an unused relative port number based on a current pointer to the storage array.

23. The network switch of claim 22, wherein the determination is based on whether the incoming port is already stored in the storage array.

* * * * *